United States Patent [19]

Miyasaki

[11] Patent Number: 5,561,940

[45] Date of Patent: Oct. 8, 1996

[54] SNARE TRAP FOR ANIMALS

[76] Inventor: Francis S. Miyasaki, 1282 Louisiana, Vernonia, Oreg. 97064

[21] Appl. No.: 537,975

[22] Filed: Oct. 2, 1995

[51] Int. Cl.⁶ ............................................. A01M 23/34
[52] U.S. Cl. .................................... 43/87; 43/85
[58] Field of Search ............................. 43/85, 86, 87, 43/80

[56] References Cited

U.S. PATENT DOCUMENTS

| | | | |
|---|---|---|---|
| 858,986 | 7/1907 | Johansson . | |
| 1,335,304 | 3/1920 | Timar | 43/86 |
| 2,247,066 | 6/1941 | Popp | 43/87 |
| 2,894,352 | 4/1957 | McDonald | 43/87 |
| 3,416,257 | 12/1968 | Dahlgren | 43/87 |
| 4,471,560 | 9/1984 | Hughan | 43/85 |
| 5,062,237 | 11/1991 | Kitagawa | 43/86 |
| 5,157,863 | 10/1992 | Godwin | 43/85 |
| 5,177,896 | 1/1993 | Miyasaki | 43/87 |

FOREIGN PATENT DOCUMENTS 0463791  3/1950  Canada ................................. 43/87

Primary Examiner—Joseph J. Hail, III
Assistant Examiner—James Miner
Attorney, Agent, or Firm—Eugene M. Eckelman

[57] ABSTRACT

An annular body member is of a size capable of allowing an animal to move at least partially through it. A snare line with a running noose therein encircles the exterior surface of the body member and has an anchored end. A trigger is disposed laterally across the interior of the body member and is a flexible type netting which the animal engages when entering the trap. The trigger is positioned to dislodge the snare line when the animal enters the trap. The snare line has elastic characteristics and is capable of engaging and binding around an animal entering the body member to hold the snare line in place until its running noose is tightened by movement of the animal away from an anchored end of the running noose. The trap can be used below ground in a burrowing animal runway or it can comprise an above ground baited housing.

13 Claims, 2 Drawing Sheets

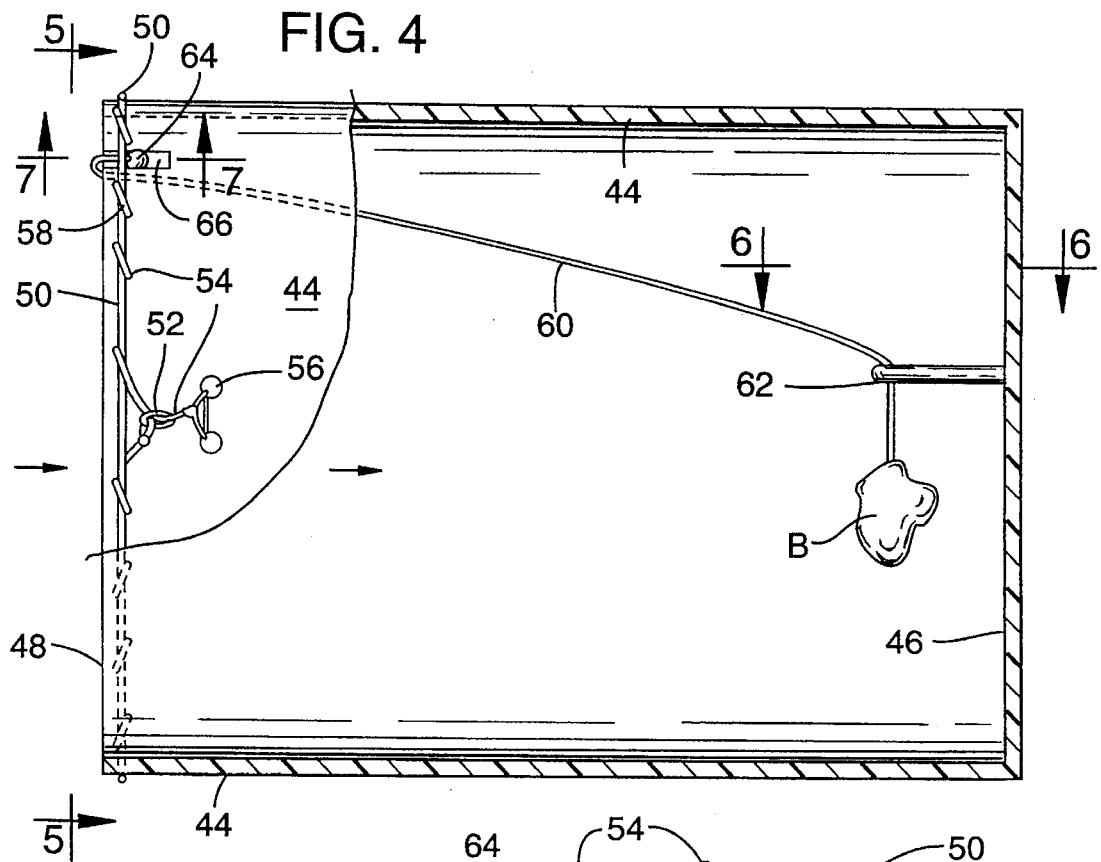
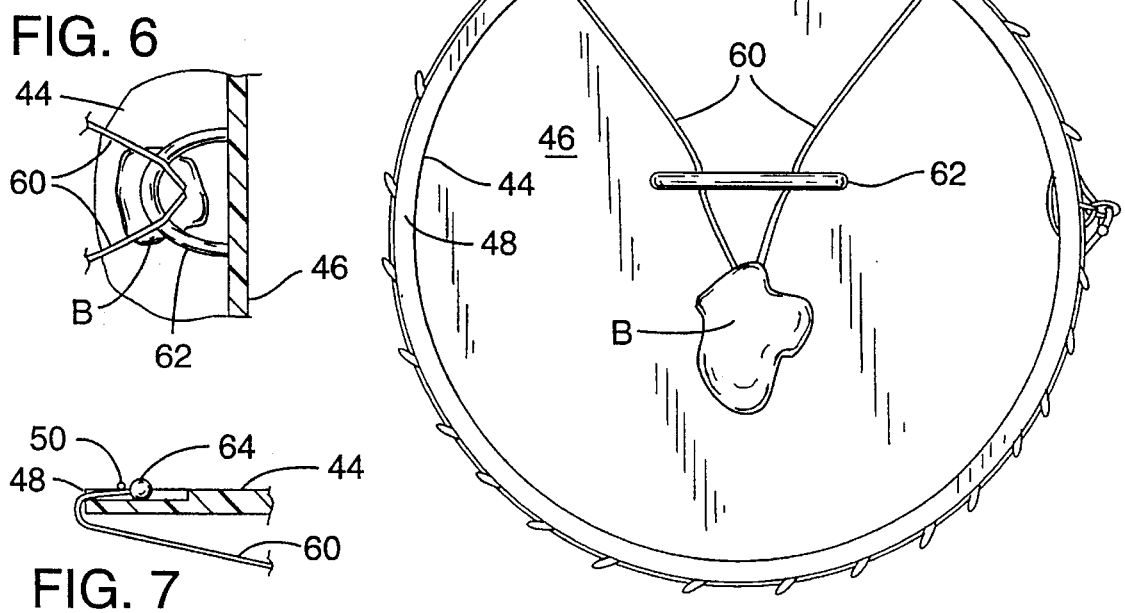

SNARE TRAP FOR ANIMALS

BACKGROUND OF THE INVENTION

This invention relates to new and useful snare traps for animals.

Traps for animals, including burrowing animals, have heretofore been used. For example, existing traps are partially or entirely buried in the ground and have metal jaws or cinch means that clamp around the animal. Also, gas bombs have been used. Such types of irradicating means have disadvantages, one such disadvantage being that they are dangerous to children, pets, or other persons. Applicant has heretofore patented an improved snare-type trap, U.S. Pat. No. 5,177,896. Such trap overcomes the above disadvantages in providing a tubular open-ended body member that is buried in the ground and that simply houses a snare line with a running noose supported at an entrance end of the trap. The body member includes a pivoted trigger lever engageable by the burrowing animal that dislodges the snare line for a snaring engagement of the animal. The snare line has an elastic band carried thereon that initially engages and binds around the animal and holds the running noose in place until the latter is tightened due to movement of the animal seeking to move away from the anchored end of the line.

SUMMARY OF THE INVENTION

According to the present invention it is an object to provide a snare trap that employs improved trigger means wherein such trigger means are extremely simplified in structure and manufacture, and efficient in operation.

Another object is to provide trigger means which are versatile in function for use in a trap structure that can be buried in the ground or be set above ground or in water.

In carrying out the objects of the invention, the trap comprises an annular body member which is arranged to receive an encircling snare line on its outer surface that is anchored at one end and has a running noose therein. Trigger means are disposed laterally across the interior of the body member and comprise a flexible type netting with openings smaller than the breadth of an animal whereby upon progressing into the trap the animal engages and carries the netting therewith. An elastic band encircles the snare line and such band and snare line are dislodged when the animal moves the netting, thus encircling the animal. The band holds the snare line in place on the animal until the running noose is tightened by movement of the animal away from the anchored end of the snare line. The annular body member and the trigger means are structured so as to operate if desired in each of two directions that an animal may move through the trap. In an embodiment of the invention a bait placed in the trap housing is used to attract an animal through an open front of a trap housing. A front surface of the housing provides a support for the snare line and elastic band and the bait line is arranged to pull the snare line and band off this surface when an animal takes the bait.

The invention will be better understood and additional objects and advantages will become apparent from the following description taken in connection with the accompanying drawings.

BRIEF DESCRIPTION OF THE DRAWINGS

FIG. 4 is a vertical sectional view of an above ground trap housing with the present snare trap installed therein.

FIG. 5 is a front elevational view of the embodiment of FIG. 4 taken on the line 5—5 of FIG. 4, and FIGS. 6 and 7 are fragmentary section views taken on the lines 6—6 and 7—7 of FIG. 4, respectively.

DETAILED DESCRIPTION OF PREFERRED EMBODIMENTS

Figure 2:
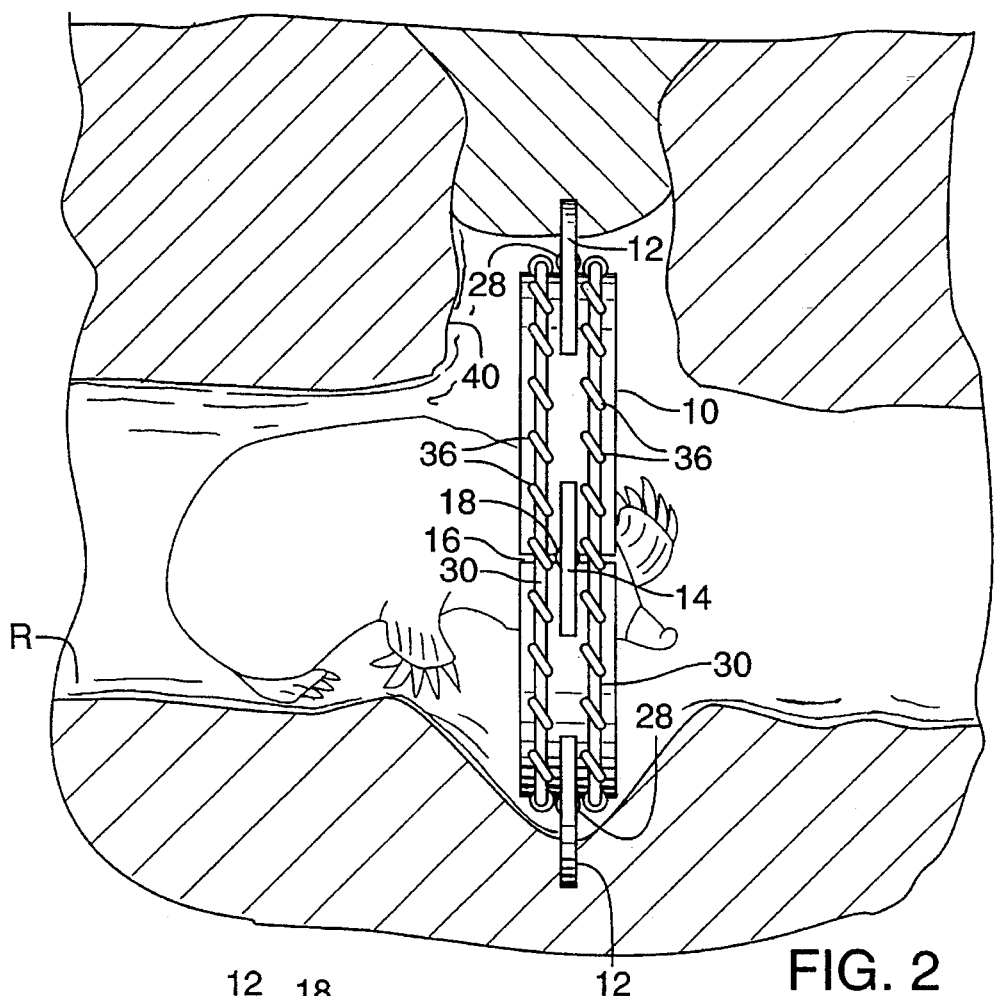
FIG. 2 is an elevational view of the trap as mounted in position in the hole of a burrowing animal.
Figure 1:
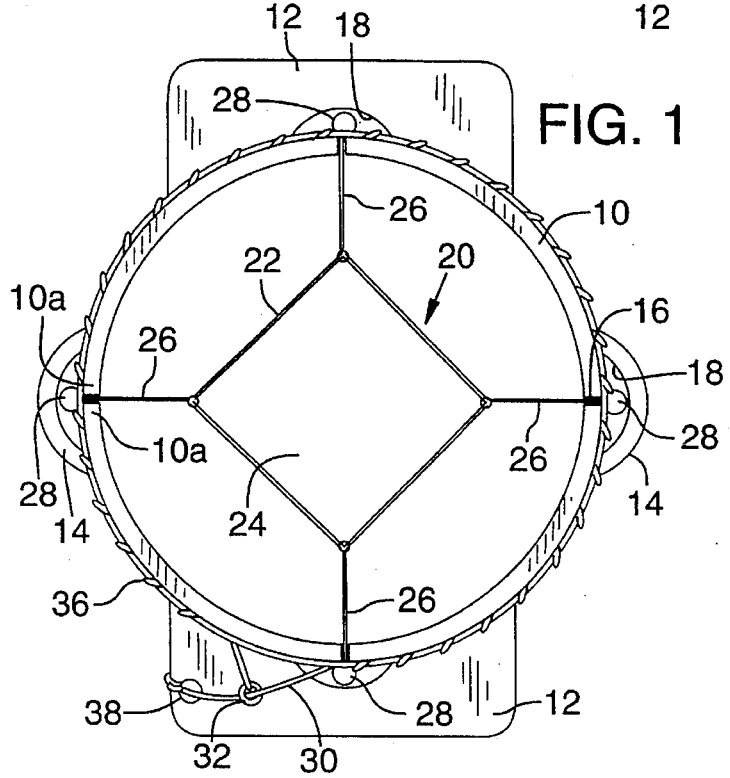
FIG. 1 is an end view of the present trap.
Figure 3:
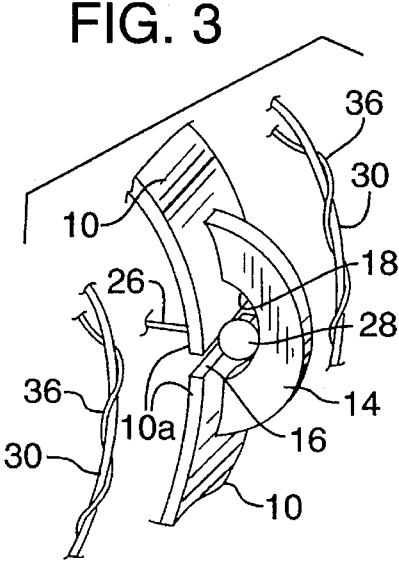
FIG. 3 is a fragmentary exploded perspective view showing details of body member sections as well as trigger details and portions of the snare line and elastic band.

With reference first to FIGS. 1–3 which illustrate a first form of the invention, the trap comprises a narrow annular body member 10 made up of four 90° segments 10a held securely in annular form by circumferentially extending connecting flanges 12 at the top and bottom and side connecting flanges 14. All of the adjacent edges of the segments 10a are separated by full length narrow slots 16. Top and bottom flanges 12 have a radial dimension sufficient to penetrate the soil to anchor the trap in a set position in the ground, as will be more apparent hereinafter. Side flanges 14 are of a size and structure only necessary to hold the segments 10a of the body member together in an integral structure. Each of the flanges 12 and 14 has a cutout 18 at the outer surface of the body member in the area of the slots.

Associated with the slots 16 is a trigger 20 in the form of a net 22 preferably having a central defining opening 24 large enough for an animal such as a burrowing animal to move only partially therethrough. The net has four lateral line extensions 26 that can be threaded into slots 16 but terminate at their outer ends in beads or other enlargements 28 of a diameter greater than the width of the slots 16. The outer ends of the laterals 26, namely, the bead ends can be slid into the respective slots 16 in edgewise movement with the beads being disposed on the outer surface of the band. Thus when the trigger netting is moved axially of the body member, the laterals 26 pull the lines 26 and beads 28 out of the slots.

The body member 10 is used with one or two snare lines 30 having a slip knot 32 therein arranged to form a running noose. The snare line has an elastic band or cord 36 wrapped around it which when stretched allows the snare line to be frictionally mounted on the outer surface of the body member 10, best seen in FIG. 2, and arranged to hold the snare line in a set trap position. Snare line 30 is anchored at one end 38 to one of the flanges 12, preferably the bottom flange.

The narrow body member 10 is used with two snare lines 30 which serve to provide a trap that works from either direction and which hold the trigger means in a set position. When setting the trap, a first of the snare lines is stretched over one end of the body member so as to lie circumferentially thereon. The beaded ends 28 of the trigger laterals 26 are then threaded into their respective slots 16 from the opposite end of the body member relative to the snare line that has been set. The beaded ends are abutted against this mounted snare line and then the second snare line is stretched in place on the end of the body member opposite from the first snare line. The beads thus rest on the outer surface of the body member in confined relation between the snare lines and spread the trigger net across the interior of the body member 10, FIG. 2. The trap is thus set and will work in either direction.

In operation, a hole 40 is dug down to the runway R in the ground, FIG. 2, and the trap set in place across the runway. The trap is placed such that the bottom flange 12 penetrates the soil firmly wherein to anchor the bottom portion of the trap against axial movement. Hole 40 is then plugged at least to a short distance below an upper portion of the top flange 12 whereby to anchor the top portion of the trap against axial movement, or if desired, the hole 40 can be only wide enough for minimum clearance insertion of the trap, thus also anchoring the trap.

When a burrowing animal progresses through the runway, it will engage the trigger 20. As the animal progresses partially through the body member, it carries the trigger net therewith which pulls the beaded ends 28 of the trigger netting off the one end of the body member. The elastic band 36 snaps around the animal with the same line 30 carried on it. The animal then will travel farther away from the anchored end 38 of the snare line wherein the running noose of the snare line tightens around its body. This cinches the noose around the animal sufficiently to hold the animal in a stationary trapped position. The trap will work in either direction of movement of the animal.

FIGS. 4 and 5 show a second embodiment of the invention having the versatility of being used above ground as well as below ground or in water. It comprises a tubular housing 44 having opposite ends 46 and 48. Associated with the housing is a snare line 50 having a slip knot or ring 52 therein that forms a running noose. The end 54 of the running noose of the snare line 50 is anchored to the housing 44 in a suitable manner such as by being tied across a pair of spaced holes 56 in the wall of the housing. The snare line has an elastic band or cord 58 wrapped around it which when stretched allows the snare line to be frictionally mounted on the outer surface of the housing 44 as shown in FIGS. 4 and 5.

The present trap uses a bait B to lure the animal into the trap to a position where the animal can be snared around the body. The bait is supported on a bait line 60 having opposite free ends and a closed end threaded through a guide ring 62 supported either on a wall 46 in a trap that has this end closed or on the housing interior surface in a trap that has this end open. The closed end portion of the bait line is attached to bait B. The opposite free ends of the bait line are attached to laterally spaced beads or enlargements 64. The beads 64 are associated with shallow, short longitudinal placement grooves 66 cut in the outer surface of the housing 44. These grooves extend only a short distance in from the front edge and receive the beads 64 in a slidable laterally stable position in a set condition of the trap.

To set the trap, a bait B is connected to the closed end portion of the bait line that has been threaded through the guide ring 62. The other or bead ends of the bait line are extended out through the open end of the housing and doubled back over this end. The beads are placed in their respective placement grooves and the snare line 50 is stretched laterally over the end of the housing and laid circumferentially thereon between the beads and the end of the housing. For convenience, the snare line can be mounted on the exterior of the body portion first and the beads then set in the slots by forcing them under the snare line.

When an animal is lured into the trap by the bait, it passes through the end 48 of the trap housing. When the animal pulls on the bait, the beaded ends of the bait line are pulled forward over the edge of the housing and carry the snare line over the edge with them. The snare line thus is caused by means of the elastic band 58 to snap around an animal's body. As the animal backs away in an attempt to free itself from the snare line, the anchor end 54 of the running noose of the snare line causes the noose to tightly close around the animal and hold it in a trapped position.

It is understood that in a housing having both ends open, a snare line and associated elastic band can be used at either or both ends. Also, it is possible that in some cases the elastic band can be used without a snare line since the elastic band could serve as the snare line. The trap housing can be suitably anchored in place if necessary by stakes or straps.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A snare trap for catching animals comprising:

an annular body member having opposite ends at least one of which ends is open, the body member having an interior of a size capable of allowing an animal to move at least partially therethrough, said annular body member having an exterior surface, a snare line encircling the exterior surface of said body member adjacent the open end of said body member and having a running noose at one end of said line, the opposite end of the snare line secured to the body member, trigger means disposed in said body member, said trigger means comprising flexible line means within the body member adapted for engagement by an animal moving into the body member, the flexible line means extending to the exterior of said body member for engagement with said snare line in a set position of the trap, whereby said flexible line means effects pulling said snare line off the open end of said body member when said trigger means is engaged by the animal, said snare line having elastic characteristics and capable when dislodged from the exterior surface of said body member by said trigger means of engaging and contracting around an animal entering the body member.

2. The snare trap of claim 1 wherein said flexible line means comprises a netting extending across the interior of the body member and having openings smaller than the breadth of an animal, whereby upon proceeding into said body member, an animal will engage and carry the netting therewith to pull said snare line off the open end of the body member.

3. The snare trap of claim 1 wherein said annular body member includes peripherally spaced longitudinally extending slots receiving the flexible line therethrough for positioning said trigger means for engagement with said snare line in a set position of the trap.

4. The snare trap of claim 3 wherein said annular body member includes a plurality of curved segments having end edges disposed in spaced relation to form longitudinally extending slots, and circumferentially extending flange means spanning said slots and securing said segments together.

5. The snare trap of claim 3 wherein said annular body member includes a plurality of curved segments having end edges disposed in spaced relation to form longitudinally extending slots, and circumferentially and outwardly extending flange means on at least an upper and lower portion of said body member capable of penetrating the ground on opposite sides of a runway when the trap is used in the ground.

6. The snare trap of claim 1 including circumferentially extending flange means projecting outwardly of the body member on at least an upper and lower portion of said body member and capable of penetrating the ground on opposite sides of a runway when the trap is used in the ground.

7. The snare trap of claim 1 wherein the body member is open at both ends, the trap including a pair of said snare lines encircling said body member one adjacent each open end, said annular body member including longitudinally extending slots for positioning said trigger means in a set position of the trap, said trigger means being positionable centrally between said pair of snare lines and capable of pulling one or the other of said snare lines off said body member depending upon the direction an animal travels.

8. The snare trap of claim 1 wherein said flexible line means includes a bait line which upon being pulled by an animal pulls said snare line off the open end of the body member.

9. The snare trap of claim 1 wherein said flexible line means comprises a bait line, means slidably supporting said bait line interiorly of said body member, said bait line having an inner end portion to which a bait can be attached, said bait line extending from said inner end portion thereof around one open end of said body member that is encircled by said snare line, said bait line, when pulled by an animal, slidably moving over said one open end to pull said snare line off said open end.

10. A snare trap for catching animals comprising:

an annular body member having opposite ends and an interior of a size capable of allowing an animal to move at least partially therethrough, said annular body member having an exterior surface, a pair of snare lines encircling the exterior surface of said body member one adjacent each end of the body and each having an anchored running noose therein, trigger means disposed in said body member, said trigger means comprising flexible line means within the body member adapted for engagement by an animal moving into the trap, said annular body member including longitudinally extending slots for positioning said trigger means on the exterior of said body member centrally between said pair of snare lines in a set position of the trap, said flexible line means imparting a pulling force on one of said snare lines, depending upon the direction an animal travels, and dislodging said snare line from said body member when said trigger means is engaged by the animal, said snare line having elastic characteristics and capable when dislodged by said trigger means of engaging and binding around an animal entering the body member.

11. A snare trap for catching animals comprising:

an annular body member having opposite ends and an interior of a size capable of allowing an animal to move at least partially therethrough, said annular body member having an exterior surface, a snare line encircling the exterior surface of said body member adjacent one end of the body member and having an anchored running noose therein, trigger means disposed in said body member, said trigger means comprising flexible line means within the body member adapted for engagement by an animal moving into the trap, said flexible line means comprising a netting having openings smaller than the breadth of an animal whereby upon proceeding into said body member, an animal will engage and carry the netting therewith to dislodge said snare line, and means forming a part of said trigger means arranged to be positioned on the exterior of said body member with said snare line in a set position of the trap, said flexible line means imparting a pulling force on said snare line and dislodging said snare line from said body member when said trigger means is engaged by the animal, said snare line having elastic characteristics and capable when dislodged by said trigger means of engaging and binding around an animal entering the body member the animal in place.

12. The snare trap of claim 11 wherein said annular body member includes a plurality of curved segments having end edges disposed in spaced relation to form said longitudinally extending slots, and circumferentially extending flange means spanning said slots and securing said segments together.

13. The snare trap of claim 11 wherein said annular body member includes a plurality of curved segments having end edges disposed in spaced relation to form said longitudinally extending slots, and circumferentially extending flange means on at least an upper and lower portion of said body member capable of penetrating the ground on opposite sides of a runway when the trap is used in the ground.

* * * * *